(No Model.)
G. BANKS.
SEAT FOR AGRICULTURAL MACHINES.
No. 357,059. Patented Feb. 1, 1887.
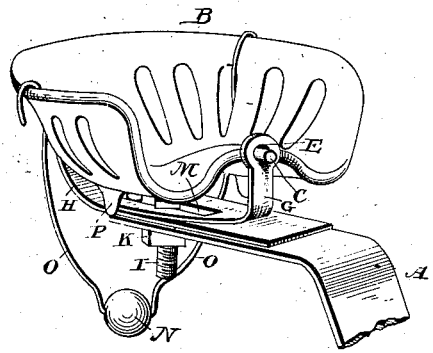
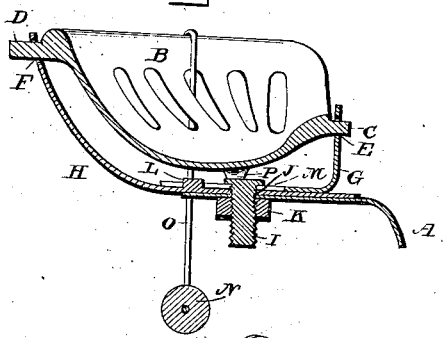
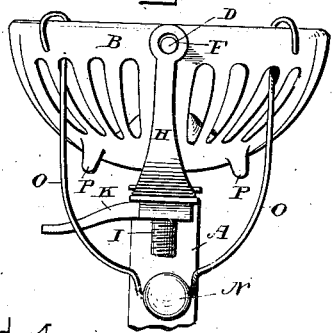
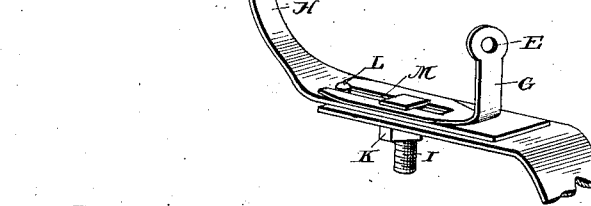
WITNESSES
C. H. Durand
Edward Stanton
George Banks.
INVENTOR,
By Louis Bagger & Co
Attorney

UNITED STATES PATENT OFFICE.

GEORGE BANKS, OF OAKFIELD, MICHIGAN.

SEAT FOR AGRICULTURAL MACHINES.

SPECIFICATION forming part of Letters Patent No. 357,059, dated February 1, 1887.

Application filed January 21, 1886. Serial No. 189,268. (No model.)

*To all whom it may concern:*

Be it known that I, GEORGE BANKS, a citizen of the United States, and a resident of Oakfield, in the county of Kent and State of Michigan, have invented certain new and useful Improvements in Seats for Agricultural Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved seat for agricultural machines. Fig. 2 is a vertical sectional view of the same. Fig. 3 is a rear view of the seat; and Fig. 4 is a view of the supports for the seat, showing the seat removed.

Similar letters of reference indicate corresponding parts in all the figures.

My invention has relation to seats for harvesters, cultivators, plows, and similar agricultural machines; and it consists in the improved construction and combination of parts of a seat for such machines, which is pivoted so as to hang level without regard to the incline of the machine to one side or the other, rendering the seat more comfortable and convenient for the driver than the usual seat, which follows the movements of the machine, as hereinafter more fully described and claimed.

In the accompanying drawings, the letter A indicates the seat-supporting spring, which may be of any desired construction and of any desired material.

B is the seat, which is of the form usually found in seats for agricultural machines, and the forward edge of this seat is formed with a projecting lug or trunnion, C, while the rear edge of the upwardly-curved portion of the side is likewise provided with a similar lug or trunnion, D. These trunnions are journaled and rock in perforations E and F in the upper ends of two upwardly-curved brackets or supports, G and H, and the end of the rear support, H, is secured to the spring A by means of a headed bolt, I, passing through a perforation, J, in the support H, and through the spring A, having its head at its upper end and a handle or thumb nut, K, upon its lower end, bearing against the under side of the spring.

The rear support is provided with a guide-lug, L, to the rear of the perforation for the bolt, and the rear portion of the front support has a longitudinal slot, M, and slides upon this lug and upon the bolt, being adjusted in its position upon the forward end of the rear support by means of the bolt, the head of which bears against the upper sides of the edges of the slot.

If desired, the seat may have a weight, N, suspended below the supports and below the spring, having supporting-rods O extending to the side edges of the seat; and this weight will serve to keep the seat level.

Stops P P project from the under side of the seat, and may bear against the inner ends of the supports and against the upper end of the spring, preventing the seat from winging too far to either side.

It will thus be seen that the seat may swing to either side and be kept level when the machine or implement is driven over the ground, relieving the driver in the seat from the uncomfortable jolting of the machine or implement in passing over rough ground, and allowing the driver to remain in an upright position in the seat without regard to the level at which the machine or implement is.

The trunnions and bearings being at different heights, the rear trunnion and bearing being above the forward trunnion and bearing, the seat will have its center of gravity below the axis of the movement of the seat, so that the seat will naturally seek the horizontal position, and the weight suspended below the seat will add to the tendency to occupy such a horizontal position. This weight, although adding to the efficiency of the seat, may be dispensed with, and the brackets may be made in one piece or be differently connected to the spring and to each other without departing from the spirit of my improvement.

By having the brackets or supports secured in the manner shown and described the seat may be removed and inserted, and the position of the seat upon the spring may be changed, the supports turning upon the bolt; and when it is desired to remove the seat the nut is loosened and the forward bracket slid forward, the slot admitting of its being drawn out of engagement with the trunnion, whereupon the rear trunnion may be drawn out of the bearing in the rear support or bracket.

Having thus described my invention, I claim and desire to secure by Letters Patent of the United States—

1. A seat for agricultural machines having trunnions upon its front and rear edges, in combination with front and rear supports having bearings at their upper ends and means for adjusting them in relation to each other and to the seat, and for securing them to the machine.

2. A seat for agricultural machines having trunnions at its front and rear edges, in combination with front and rear supports having bearings at their upper ends and being slotted at their lower ends, and a bolt through said slots for securing them to the machine.

3. A seat for agricultural machines having trunnions upon its front and rear edges, in combination with a rear support having a bearing at its upper end and a slot and a lug at its lower end, a front support having a bearing at its upper end and a slot in its lower end, and a bolt for securing said supports to the machine.

In testimony that I claim the foregoing as my own I have hereunto affixed my signature in presence of two witnesses.

GEORGE BANKS.

Witnesses:
S. B. JONES,
ED. H. JONES.